US006083739A

United States Patent [19]

Franks

[11] Patent Number: 6,083,739

[45] Date of Patent: Jul. 4, 2000

[54] TREATMENT OF CELLULOSE FABRICS WITH CELLULASES

[75] Inventor: Neal Edward Franks, Raleigh, N.C.

[73] Assignee: Novo Nordisk Biochem North America, Inc., Franklinton, N.C.

[21] Appl. No.: 09/159,860

[22] Filed: Sep. 24, 1998

Related U.S. Application Data

[60] Provisional application No. 60/060,226, Sep. 29, 1997.

[51] Int. Cl.[7] .......... C12S 11/00

[52] U.S. Cl. .......... 435/263; 435/277; 8/112; 8/116; 8/401; 19/40

[58] Field of Search .......... 435/263, 277; 19/40; 8/112, 116, 401

[56] References Cited

U.S. PATENT DOCUMENTS 5,466,601 11/1995 Jenkins et al. .......... 435/263

FOREIGN PATENT DOCUMENTS 100224 of 1916 United Kingdom .
750352 6/1956 United Kingdom .

OTHER PUBLICATIONS

Bach et al., Textilveredlung, vol. 29, No. 10, pp. 284–288 (1994).

U. Roessner, Melliand Textilberichte, vol. 74, No. 4, pp. 144–164 (1993).

*Primary Examiner*—David A. Redding
*Attorney, Agent, or Firm*—Steven T. Zelson, Esq.; Reza Green, Esq.

[57] ABSTRACT

This invention relates to a cellulase treatment of cellulosic fabric to achieve biopolishing effects, reducing dust or lint and reducing pilling during at least one laundry cycle in said fabric comprising treating said fabric with cellulase after the scouring step and before the bleaching step.

22 Claims, 4 Drawing Sheets

TREATMENT OF CELLULOSE FABRICS WITH CELLULASES

CROSS-REFERENCE TO RELATED APPLICATIONS

This application claims priority under 35 U.S.C. 119 of U.S. Provisional Application Ser. No. 60/060,226 filed Sep. 26, 1997, the contents of which are fully incorporated herein by reference.

FIELD OF THE INVENTION

This invention relates to an improved cellulase treatment of a nondyed cellulosic fabric, the improvement comprising treating said fabric with cellulase after the scouring step and before the bleaching step. As a result, there will be a reduction in pilling during at least one laundry cycle in said fabric as compared to prior art methods for cellulase treatment.

BACKGROUND OF THE INVENTION

Most newly manufactured cotton fabrics and cotton blend fabrics have a handle that is rather hard and stiff unless they are treated with finishing components. Furthermore, the fabric surface is not always smooth due to small fuzzy fibers protruding from the individual cotton fibers. In addition, after a relatively short period of wear, collections of lint appear on the surface (surface linting) giving the appearance of "pills" on the surface which causes the fabric to have an unappealing, worn look. In polyester fabrics, this phenomena is actually "pilling" and provides a similar unappealing fabric appearance. The term "pilling" will also apply to cellulosic fabrics in the instant application.

Fabric softness and smoothness can be obtained by using finer, i.e., higher count value, yarns in the manufacture of a given fabric. A second method, building on the first approach is to use yarns prepared by the ring spinning process as opposed to the less expensive open-end process. However, the resulting cost is higher and fabric output decreases concurrently with the yarn count.

A less expensive way of ensuring a soft and smooth fabric "handle" is to impregnate the finished fabric with a softening agent, typically a cationic, sometimes silicone-based, surface active compound. However, this treatment does not remove pills and fuzz. Furthermore, the fabric obtains a somewhat greasy "handle"and is not wash-proof, and its moisture absorbency is often considerably reduced. This approach can have a negative influence on other wet processing steps, notably in causing an uneven dye uptake by the finished fabric.

Another known method for obtaining a soft and smooth fabric is treating cellulosic fabrics with cellulases. See Bazin et al., "Enzymatic Bio-Polishing of Cellulosic Fabric," presented at the 58th Congress of the Association of Chemists and the Textile Industry in Mulhouse, France (Oct. 25, 1991) and Asferg et al., "Softening and polishing of cotton fabrics by cellulase treatment," ITB Dyeing/Printing/Finishing (February 1990).

Cellulase treatment of the fabric surface improves fabric quality with respect to handle and appearance without loss of fabric wettability. The most important effects are less fuzz and pilling, increased gloss/luster, improved fabric handle, increased durable softness and improved water absorbency. These effects are referred to as biopolishing effects.

Various methods involving cellulase treatment have been disclosed in the art. For example, WO 9320278 discloses that biopolishing is achieved during the manufacture of cellulosic fabrics by successive (1) cellulase treatment of the fabric without significant mechanical treatment, then (2) mechanical treatment. The benefit of mechanical action is also disclosed in Cavaco-Paulo et al., 1994, Biocatalysis 10:353–360. Cavaco-Paulo et al., 1996, Textile Res. J. 66:287–294 discloses that at low agitation levels, pretreatment with monocomponent endoglucanase did not cause significant weight loss in a cotton fabric. At high agitation levels, significant weight loss was observed along with microfibrillar material torn away from the fiber surface.

Although this improved removal of surface fibers and fuzz is satisfactory in the laboratory, the textiles industry is moving toward the input of less mechanical action in the batch equipment now in operation. By not using mechanical action, there is less disturbance of the fabric surface presenting less opportunity for pilling and an unsatisfactory aesthetic appearance of the fabric when purchased by the customer. The outgrowth of this change is that the more aggressive multicomponent cellulases like those produced by *T longibrachiatum* are used to minimize pilling in the treated fabric For example, WO 9412578 discloses the treatment of a cellulosic fabric comprising (a) a first treatment with a cellulase to achieve a weight loss of 0.05–10 wt % of the fabric; (b) a second treatment with a cellulase to achieve a weight loss of 0.05–10 wt % of the fabric after step (a).

Cellulase treatment has also been found to reduce lint. U.S. Pat. No. 5,466,601 discloses a process that selectively removes embedded cellulose lint precursors from a cotton fabric by applying a cellulase solution continuously during the manufacturing process.

In the batch processing of cotton fabrics, namely interlock knits, the cellulase treatment has been applied at the end of the processing process, on the scoured, bleached, and dried fabrics (See Cavaco-Paolo et al, above). In some cases, the cellulase treatment has been attempted after the dyeing step with mixed results (W. R. Goynes et al, Textile Chemist and Colorist, December 1996, p. 25–29) on either the finished fabric, or after conversion to garment form. Not much attention given to the morphology or the chemical content of the cuticle and primary wall of the cotton fiber. Published reports describing the make-up of these parts of the cotton fiber describe the presence of various lipids, protein, and carbohydrate polymers including polygalacturonic acid partially esterified as the methyl ester. (Carpita and Gibeaut, *The Plant Journal* (1993) 3(1), 1–30).

During the course of scouring and alkaline peroxide bleaching/brightening certain chemical changes will occur in both the cuticle and primary fiber wall. These changes are important to the final acceptance of fabric, and how it behaves in further processing and final use. During the application of caustic, in either the scouring or bleaching/brightening process, the fiber wall would undergo a swelling process due to the charged carbohydrate polymers present, or due to the oxidation caused by the action of peroxide.

Once dried, however, the matrix formed by these polymers could hinder rehydration and access to the fibrils/microfibrils upon which the cellulase action is necessary to remove the materials which later cause the pilling effect. This same effect is known in wood fibers and is termed "hornification", which implies that the drying of the pulp fiber wall so changes the subsequent rehydration as to significantly impede water regain. This is of some consequence in the processing of recycled fibers and their reconversion into paper. This same effect, when applied to cotton fibers after they have been once rehydrated and dried, is a way to explain the need for higher levels of mechanical agitation to achieve a measurable effect with some classes of cellulases.

It is an object of the present invention to provide an improved enzymatic process for treating cellulosic fabrics.

It is also an object of the invention to reduce pilling of a fabric during subsequent launderings.

It is also an object of the present invention to improve the uniformity and rate of dye uptake during the dyeing stage of a dyed fabric.

SUMMARY OF THE INVENTION

The invention is directed to an improved process for treating a nondyed 100% cellulosic fabric with cellulase comprising scouring said fabric under alkaline conditions, treating said fabric with cellulase bleaching said fabric and drying the fabric, in which the improvement comprises treating the fabric with cellulase before the bleaching step. As a result, there is a reduction of pilling during at least one laundry cycle as compared to the prior art method. Reduction of pilling also occurs in said cellulosic fabric when said fabric is treated with cellulase according to the method of the present invention as compared to when no cellulase treatment is applied. Biopolishing effects will also be achieved.

As defined herein, a "laundry cycle" is at least about 45 minutes and includes washing and drying. In one embodiment, a laundry cycle is from about 45 minutes to about 120 minutes. In a preferred embodiment, a laundry cycle is from about 45 minutes to about 95 minutes.

In a preferred embodiment, pilling in a fabric is reduced during at least five laundry cycles. In a most preferred embodiment, pilling is reduced during at least 15 laundry cycles.

It has surprisingly been found that by moving the cellulase treatment (biopolishing) closer to the front end of the wet processing steps, the cellulase can more easily have access to the fibrils/microfibrils which cause linting and pilling in the finished fabric. Therefore, mechanical agitation during the biopolishing step becomes much less important in achieving a lessened tendency for the fabric to form surface lint pills.

In contrast to processes disclosed in the prior art, both a multicomponent and/or a monocomponent cellulase may be used. Additionally, only one cellulase treatment is necessary.

In the process of the present invention, cellulase treatment is near the beginning of the wet processing sequence. Therefore, any fibrils/fines produced by the cellulase treatment should have a greater opportunity to diffuse out of and away from the fabric to produce less troublesome carryover into the fabric conversion stage.

The method of the present invention further has the advantage of eliminating the necessity of a cellulase inactivation step, since the cellulase treated fabric is subjected to an alkaline peroxide bleaching step after the biopolishing step.

DETAILED DESCRIPTION OF THE INVENTION

Figure 1:
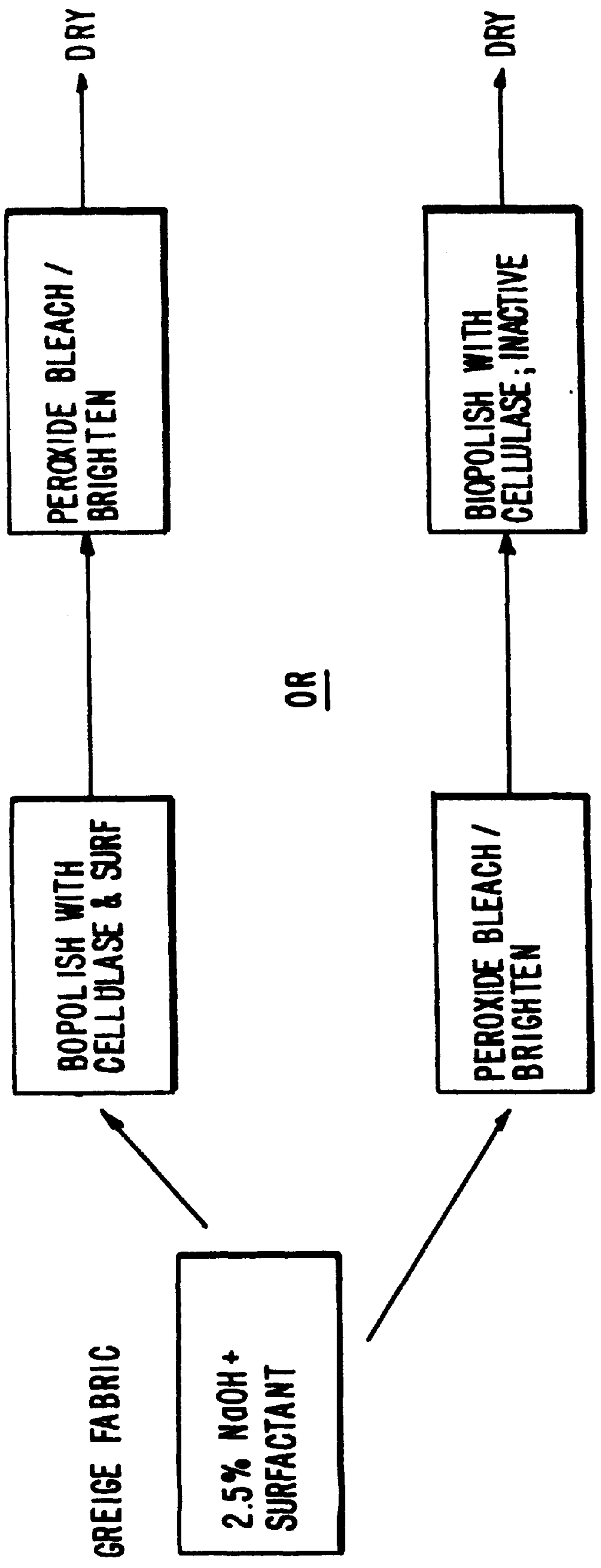
FIG. 1 shows the experimental strategies for biopolishing during wet processing.

The present invention is directed to an improved process for treating a nondyed 100% cellulosic fabric. The 100% cellulosic fabric may be a cotton, ramie, or man-made cellulosic, especially those made using fibers produced via the Lyocell process.

The process of the invention involves four steps: scouring the fabric; treatment of the scoured fabric with cellulase; bleaching the cellulase treated fabric; and drying the bleached fabric. Additionally, the method of the invention may further comprise the step of dyeing said fabric after bleaching and before drying. The steps involved in the process of the present invention are described in detail below.

Scouring

During the scouring step, the fabric is treated with a scouring agent, which includes but is not limited to sodium hydroxide, soda ash, trisodium phosphate, and other alkine materials, which produce an elevated pH. In addition, surfactant(s) would be included under these alkaline conditions. Such surfactants could include non-ionic, anionic, or mixtures or such surfactant classes. The scouring stage will usually be performed at elevated temperatures (80–100° C.) and for periods as long as about one hour and preferably at least about 30 minutes at that temperature.

Cellulase Treatment

The process of the invention comprises cellulase treatment of the fabric. The cellulase to be used according to the present invention may be any cellulase having cellulolytic activity, i.e., hydrolyzes cellulose, either in the acid, the neutral or the alkaline pH-range and having cellobiohydrolase, exo-cellobiohydrolases, endoglucanases, and/or beta-glucosidase activity (multicomponent or monocomponent). The cellulase may be of fungal or bacterial origin, which may be obtainable or isolated and purified from microorganisms which are known to be capable of producing cellulolytic enzymes, e.g., species of Humicola, Coprinus, Thielavia, Myceliopthora, Fusarium, Myceliophthora, Acremonium, Cephalosporium, Scytalidium, Penicillium or Aspergillus (see, for example, EP 458162), especially those produced or producible by a strain selected from the species *Humicola insolens* (reclassified as *Scytalidium thermophilum,* see for example, U.S. Pat. No. 4,435,307), *Coprinus cinereus, Fusarium oxysporum, Myceliophthora thermophila, Meripilus giganteus, Thielavia terrestris, Acremonium sp., Acremonium persicinum, Acremonium acremonium, Acremonium brachypenium, Acremonium dichromosporum, Acremonium obclavatum, Acremonium pinkertoniae, Acremonium roseogriseum, Acremonium incoloratum,* and *Acremonium furatum;* preferably from the species *Humicola insolens,* DSM 1800, *Fusarium oxysporum,* DSM 2672, *Myceliophthora thermophila,* CBS 117.65, *Cephalosporium sp.,* RYM-202, *Acremonium sp.,* CBS 478.94, *Acremonium sp.,* CBS 265.95, *Acremonium persicinum,* CBS 169.65, *Acremonium acremonium,* AHU 9519, *Cephalosporium sp.,* CBS 535.71, *Acremonium brachypenium,* CBS 866.73, *Acremonium dichromosporum,* CBS 683.73, *Acremonium obclavatum,* CBS 311.74, *Acremonium pinkertoniae,* CBS 157.70, *Acremonium roseogriseum,* CBS 134.56, *Acremonium incoloratum,* CBS 146.62, and *Acremonium furatum,* CBS 299.70H. Cellulase may also be obtainable from Trichoderma (particularly *T. viride, T. reesei,* and *T. koningii*), alkalophilic Bacillus (see, for example, U.S. Pat. No. 3,844,890 and EP 458162), and Streptomyces (see, for example, EP 458162).

The cellulase used in the method of the present invention may be produced by fermentation of the above mentioned microbial strain on a nutrient medium containing suitable carbon and nitrogen sources and inorganic salts, using procedures known in the art (see, e.g., Bennett, J. W. and LaSure, L. (eds.), *More Gene Manipulations in Fungi,* Academic Press, CA, 1991). Suitable media are available from commercial suppliers or may be prepared according to published compositions (e.g., in catalogues of the American Type Culture Collection). Temperature ranges and other conditions suitable for growth and cellulase production are known in the art (see, e.g., Bailey, J. E., and Ollis, D. F., Biochemical Engineering Fundamentals, McGraw-Hill Book Company, NY, 1986).

As defined herein, the term "fermentation" is any method of cultivation of a cell resulting in the expression or isolation of the cellulase. Fermentation may, therefore, be understood as comprising shake flask cultivation, small- or large-scale fermentation (including continuous, batch, fed-batch, or solid state fermentations) in laboratory or industrial fermenters performed in a suitable medium and under conditions allowing the cellulase to be expressed or isolated.

The resulting cellulase produced by the methods described above may be recovered from the fermentation medium by conventional procedures including, but not limited to, centrifugation, filtration, spray drying, evaporation, or precipitation. The recovered protein may then be further purified by a variety of chromatographic procedures, e.g., ion exchange chromatography, gel filtration chromatography, affinity chromatography, or the like.

The cellulase may be a multicomponent or monocomponent cellulase. An example of a multicomponent cellulase is Cellusoft L™, which is produced by a *Trichoderma sp.* and supplied by Novo Nordisk A/S, Denmark. A monocomponent cellulase is a component essentially free of other cellulase components usually occurring in a cellulase system produced by a given microorganism. The single component may be a recombinant component, i.e., produced by cloning of a DNA sequence encoding the single component and subsequent cell transformed with the DNA sequence and expressed in a host, cf. e.g. International Patent Applications WO 91/17243 and WO 91/17244 which are hereby incorporated by reference. Other examples of monocomponent cellulases include but are not limited to those disclosed in JP-07203960-A and WO-9206209. The host is preferably a heterologous host, but the host may under certain conditions also be the homologous host.

In a specific embodiment, the monocomponent cellulase is Cellusoft Ultra™ which is supplied by Novo Nordisk A/S, Denmark. This cellulase is a variant of a monocomponent cellulase produced by *Humicola sp.* In another embodiment, the cellulase is an optimized combination of a multicomponent and a monocomponent cellulase, designed to provide enhanced biopolishing results on cotton fabrics.

Enzyme dosage greatly depends on the enzyme reaction time, i.e., a relatively short enzymatic reaction time necessitates a relatively increased enzyme dosage, and vice versa. The reactions may be run at a pH of about 4to about 9.5at a temperature of about 10 to about 65° C. for about 1 minute to about 72 hours. If the pH is between about 4 and about 6.5, an enzyme dosage of about 200 to about 2,000 EGU/kg fabric is used EGU stands for endoglucanase units as measured by a viscosity chance in carboxymethylcellulose (CMC) at pH 6.0. It is defined in Novo Nordisk Analytical Method AF 275/1-GB, available on request from Novo Nordisk Biochem. If the pH is between about 6.5 to about 9.5, an enzyme dosage of about 1,000 to about 10,000 ECU/kg fabric is used. Endo-cellulase units, as determined by a viscosity change in CMC at pH 7.5, and detailed in Novo Nordisk Analytical method AF 302.1/1-GB, available from Novo Nordisk Biochem.

Bleaching

During the bleaching step, the fabric is treated with a bleaching agent which includes but is not limited to hydrogen peroxide, sodium hypochlorite, and/or sodium chlorite. Peroxide bleaching may be performed using, for example, a dye beck,jet dyer, or J-tube apparatus by applying a peroxide bleaching liquor to the fabric. The individual chemical constituents in the bleach liquor may be 0.5–2% (on weight of fabric, owf) hydrogen peroxide, 0.5–2% sodium hydroxide, 1–4% sodium silicate (42 'Be), diethylenetriaminepentaacetic acid (DTPA) as its sodium salt. The bleach liquor may further comprise a surfactant, a lubricant and/or a stabilizer. Both the dye beck and jet dyer are batch processing units, and the bleaching would be run for as little as 30 minutes, and as long as 150 min, at temperatures as low as 50° C. and as high as 85° C.

At the end of the selected tine, the bleaching liquor is sewered, and the fabric is washed in a dilute weak acid containing a reducing agent (<2% sodium bisulfite (owf) or sodium thiosulfate) to neutralize the residual caustic and peroxide. After a further fresh water rinse, the fabric could be dyed or dried subsequent to any further processing. A general treatment of cotton fabric bleaching is provided by W. S. Hickman, Rev. Prog. Coloration, 26, 29–46 (1996).

Dyeing

A dyeing step may optionally be inserted between the bleaching and drying step. Cellulosic fabrics are dyed using several classes of dyestuffs, including both direct dyes and reactive dyes. Direct dyes are dependent on the affinity of the dyestuff for the cellulosic matrix in the fiber. The rate of dye uptake may be increased by adding an inorganic salt to the dyebath to help increase the rate of dyeing and the final color yield.

An example of this procedure, ASTM Standard Method D 1464–90 published in the Annual Book of ASTM Standards, by the American Society of Testing and Materials, 1916 Race St., Philadelphia, Pa. 19103; (1990). This method uses both a direct red and a direct green dye to characterize the dyeing behavior of cotton. In this example, the application of the two dyes can provide an indication of the relative maturity of the fibers contained in the fabric and thus serves as an analytical tool. Applying direct dyestuffs alone or in other combinations can provide a fabric of the desired hue for end-use.

Reactive dyestuffs contain a functional group which will react with a hydroxyl residue on the cellulose backbone. In a specific embodiment, the application is usually a two-step process, the first resulting in the adsorption of the dyestuff onto the cellulosic fiber. This may be achieved by adding amounts of an inorganic salt (sodium chloride or sodium sulfate) to the dyebath to minimize the solubility of the dye in the dyebath. After the adsorption step is completed, the pH of the dyebath is increased (>pH 11) by adding a source of hydroxyl anions to the dyebath. The subsequent ionization of the cellulosic hydroxyl groups causes them to react with the reactive moiety on the dyestuff, and thus fixes the dye to the fiber. There are several classes of reactive dyes including but no limited to those with monochlorotriazine, dichlorotriazine, and vinylsulfone reactive groups. To a jet dyer containing both the fabric and water at –10–15:1 liquor to goods ratio, the selected dyestuff will be added at 2–4% dyestuff owf. The inorganic salt will be added (4–10% owf) and the heating cycle will be started. After a given amount of time to assure sufficient dye adsorption by the fabric, and at a desired temperature, a caustic preparation sufficient to increase the pH to 11 or greater will be added, and the dyeing cycle will continue until judged complete.

The dyeing liquor may then sewered, and the fabric is subjected to several rinses with fresh water to assure that the dyestuff, which failed to react with the fabric, is removed.

Drying

One standard drying method applied to knit fabrics after wet processing is to dry them under restrained conditions in a piece of equipment like a tender frame. In this unit, the fabric is held firmly between two moving chains, which can grasp the fabric firmly on each of the two sides. The fabric is moved through some form of ovens which will dry the fabric in restrained fashion. At the end of this drying process the fabric can be taken up in roll form, or subjected to further treatment like slitting, singeing, etc.

Another drying process applied to textile fabrics is to pass the moving fabric across heated dryer cans, alternating the fabric sides which will equalize the rate of drying in the two surfaces of the knitted tube or woven fabric.

EXAMPLES

Example 1

Experimental

Equipment:

Werner-Mathis JFO jet dyer, sold by Werner Mathis, U.S.A., Concord, N.C. Nu-Martindale pilling tester, James H. Heal, and sold by Crosrol, Inc., Greenville, S.C.

Mullen burst tester, manufactured by B. F. Perkins, Chicopee, Mass.

Macbeth OMS-1 Optiview, manufactured by Macbeth Division, Kollmorgen Instr. Corp., New Windsor, N.Y.

Balance, pH meter, etc.

Chemicals/Enzymes:

Enzymes: Cellusoft Ultra™, 162 ECU/g (Novo Nordisk, A/S);Cellusoft L™, 810 EGU/g (Novo Nordisk A/S); Mixture A, 302 EGU Cellusoft L™+112 ECU Cellusoft Ultra™/g Buffer: 0.05 M sodium acetate, from sodium acetate trihydrate, adjusted to pH 5+/−0.1.

Chemicals: Discoterge 1467 is a proprietary scouring aid made and distributed by Callaway Chemicals, Colunbus, Ga. It contains, among other things a surfactant blend suited for scouring. Levapon HT is a textile peroxide bleaching stabilizer manufactured and distributed by Bayer Corp., Rock Hill, S.C. Inkmaster 750 nonionic surfactant from Rhone Poulenc (Used at 0.5% owf (on weight of fabric) in alkaline scour, at 0.1% owf for biopolishing, and at 0.25% owf in peroxide step.) Inkmaster 750 is described in European Patent 0 717 144 A1 as being a nonionic surfactant made from a straight chain or branched alcohol having a carbon no. of from 16–20, oxyethylene groups from 10 to 20, oxypropylene groups between 4 to 8. Hydrogen Peroxide, 50%, is from Aldrich (Catalog item 42,065). Sodium silicate, 42 'Be, contains 14% NaOH and 27% $SiO_2$ (Aldrich Catalog item 33,844-3).

Fabric: An unbleached cotton interlock knit fabric is used as test fabric. The weight of this fabric is ~200 g/ sq. meter.

Conditions for Individual Steps:

Alkaline Scour

A tube of unbleached cotton knit test fabric is prepared by slitting a 5.5 m length tube of the as-received fabric. Each 5.5 m piece will then provide, upon seaming, two tubes suitable for biopolishing. The sewn tubes are conditioned in the constant temperature and humidity room overnight prior to weighing.

After weighing, the tube is washed in a standard Kenmore washer, centrifuged to remove excess water, and placed in the Mathis jet dyer. The alkaline scour is run using 2.5% sodium hydroxide owf (use 50% aqueous sodium hydroxide) and a detergent according to directions. The scouring is done using a 7.5:1 liquor; goods ratio, and 90° C. for 60 min. The desired flow rate is ~75 l/min, and is determined by foam levels in the unit. The winch speed setting is 13, which corresponds to a fabric speed of 16 m/min.

At the end of the scouring sequence, the liquor is dropped, and as much of the residual liquor is stripped from the tube by continuing to operate the winch. A solution of acetic acid (2% glacial acetic acid, owf) in 18 l of warm water is added, and the jet is run for a further 10 min to neutralize the residual caustic.

Biopolishing

The biopolishing stage is run at a liquor:goods ratio of 7.5:1 containing 0.1% Inkmaster 750 owf. The buffer used is 0.05 M sodium acetate at pH 5; a concentrated buffer solution is added to the required volume of warm water in the jet dyer's holding tank. The diluted buffer solution is added to the fabric, and allowed to circulate through the jet dyer for about 5 min. before withdrawing a 200 ml aliquot used to measure the liquor pH. If the pH is high, small amounts (1–2 ml) of glacial acetic acid are added to achieve the target of 5 +/−0.1.

Once the pH is achieved, the unit is programmed to run for 60 min at 55° C. The enzyme is added when this temperature is achieved. At the end of the 60 min. biopolishing period, the liquor is dropped, although small amounts are removed to examine for the presence of liberated fibers. Again, the fabric is run across the winch for a short period to strip any free liquor from the fabric.

Peroxide Bleaching 4 g of DTPA and the desired amount of surfactant is suspended in one liter of water and stirred with a magnetic stirrer; sufficient caustic is added to the DTPA suspension to bring it in solution as its sodium salt. A separate preparation which comprises 2% (owf) of 50% NaOH is weighed out and combined with an additional 3% (owf) of sodium silicate (42 'Be).

Warm tap water is charged to the holding tank; with the one liter of DTPA:surfactant added to it, the volume is sufficient so that the total with the will provide a 7.5:1 liquor:goods ratio. The liquor is dropped into the jet dyer and programmed to achieve a temperature of 70° C., and to remain there for 60 min.

Hydrogen peroxide, 50 wt %, is weighed out to provide 1% of 100% active material owf. It is added to the jet dyer when the temperature, 60° C., is achieved and allowed to circulate. The combined caustic/silicate charge is added as the temperature approached 70° C. Dilution and wash liquor for this material is removed from the dyer. Extreme foaming is observed at this stage, and the liquor flow may need to be slowed to minimize the foaming potential.

After 60 min. at this temperature, the liquor is dropped (sewered), but liquor samples are collected to visually examine for the presence of fibers liberated during the process. Again, any free liquor is stripped from the fabric by running the winch after the liquor has been dropped.

The fabric is washed using 18 l of warm water which contains 2% (owf) of glacial acetic acid and 2% (owf) of sodium thiosulfate. After 15 min, this is dropped, and a further 18 l of warm water is added for a final 10 min. wash.

The fabric tube is removed, centrifuged, and dried for 50 min. in a tumble dryer. The lint is removed and weighed, and the fabric was dried for a further 20 min. The tumble-dried knit tube was allowed to condition under AATCC conditions (65% Relative humidity ±2% and 70° F.±2) for at least 24 hr.

Results

Pilling

The data contained in Table 1 compares pilling results obtained with the Scour—Biopolish—Bleach/brighten—Dry method (Sample "A") described above and with the same fabric biopolished after is has undergone a Scour—Bleach—Dry treatment (Sample "B") using a commercial multicomponent cellulase mixture (Cellusoft L), a commercial monocomponent cellulase (Cellusoft Ultra™) and a mixture of Cellusoft L™ and Cellusoft Ultra™. It is necessary to inactivate residual cellulase activity in the Sample "B" fabrics using a 2%(owf) sodium carbonate treatment at 80° C. for 20 min.

The amount of pilling is determined by mounting the fabric specimen samples on a Nu-Martindale pilling tester. This unit has a counter which counts the number of revolutions which the fabric has experienced. It automatically shuts off after 125,500, and 2000 revolutions allowing the operator to make a visual comparison of the amount of pilling with standards supplied with the unit. The whole operation is run as is ASTM Method D 49170-89. The measurement scale goes from 1.5 to 5, with the upper values representing no/little pilling at the point where the observations are made.

TABLE 1

Pilling Values of Treated Fabric

| Treatment | Sample | 125 Rev | 500 Rev | 2000 Rev |
|---|---|---|---|---|
| Wash Only | | 1.5 | 1.5 | 1.5 |
| Scour/Bleach | | 1.5 | 1.5 | 1.5 |
| Cellusoft L ™ | A | 5 | 4.83 | 4.5 |
| | B | 4.83 | 4 | 3.75 |
| Mixture A | A | 4.92 | 4.58 | 3.92 |
| | B | 4.92 | 4 | 3.58 |
| Cellusoft Ultra ™ | A | 4.5 | 4.25 | 3.92 |
| | B | 4.17 | 3.58 | 2.83 |

It is clear that superior results are obtained when the biopolishing step is added as an intermediate step between scouring and bleaching. (Series"A").

Physical Property Changes

Any large physical property change in the knit fabrics is undesirable to the commercial acceptance of this concept. The burst property in the Mullen Burst Tester is the pressure required to rupture the fabric, is measured in psi (pounds/sq. in.) and is the physical property used as a guideline here to monitor changes caused by the cellulase during these treatments. The tests were performed using the Mullen Tester, Model C, manufactured by B. F. Perkins, Chicopee, Mass. This test method is described in ASTM Method D-2210-64 which measures the force required to rupture the fabric being tested by a hydraulically driven diaphragm. The fabric is tested in a restrained state; the force to rupture this fabric is measured in pounds per square in. (psi). This method is a well known technique, and is used in the textile industry and other industries where burst or rupture properties are important in the final performance of the product.

Figure 2:
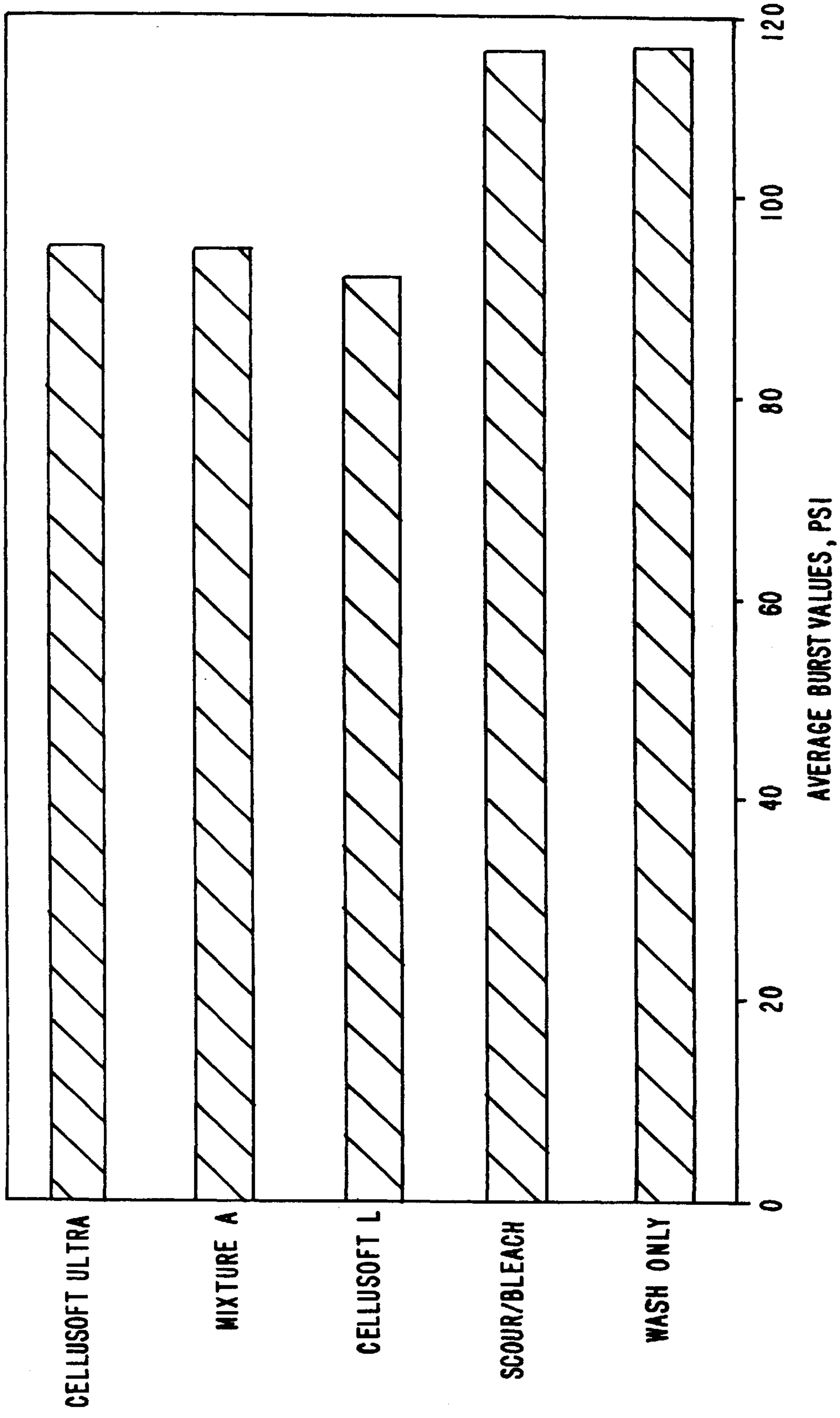
FIG. 2 shows the burst data for various samples.

FIG. 2 and Table 2 contains the burst data for the best-performing samples as seen from the pilling results. The baseline values for wash only and scour/bleach only are comparable, and would indicate that the scouring and bleaching conditions did not unnecessarily tender the fabric. Only a small decrease in the burst values is observed for the Cellusoft Ultra™, Mixture A, and Cellusoft L™ treated samples.

Achieving a minimal loss of physical properties, here measured by the Mullen burst property is important to the end-user of the fabric, since larger losses of physical properties could be reflected in premature failure of the garment made from the fabric. It might also be reflected in unexpected failure in the wet state, since the fiber properties when wet are inferior to those of the dry state fiber.

TABLE 2

Burst Values

| Sample | Ave. Burst, psi |
|---|---|
| Wash only | 114.3 |
| Scour/Bleach | 114.3 |
| Cellusoft L ™ | 93 |
| Mixture A | 96.5 |
| Cellusoft Ultra ™ | 97.3 |

Example 2

Experimental

Equipment

The equipment used in this example is the same as that used in Example 1.

Tests/Analysis

Pilling (Nu-Martindale), AATCC laundry evaluation Test Method 124-1996, with visual pill examination after 5, 15, and 30 cycles, and Mullen burst test on fabrics after scour:biopolish:bleach treatment.

Chemicals/Enzymes

The enzymes, buffer, fabric and other materials used are the same as in Example 1 except that Cellusoft L™ has an activity of 783 EGU/g is used.

Conditions for Individual Steps:

Alkaline Scour

A tube of unbleached cotton knit test fabric is prepared by slitting a 5.5 m length tube of the as-received fabric. Each 5.5 m piece will then provide, upon seaming, two tubes suitable for biopolishing. The sewn tubes are conditioned in the .constant temperature and humidity room overnight prior to weighing.

After weighing, the tube is washed in a standard Kenmore washer, centrifuged to remove excess water, and placed in the Mathis jet dyer. The alkaline scour is run using 2.5% sodium hydroxide owf (use 50% aqueous sodium hydroxide) and a detergent according to directions. The scouring is done using a 7.5:1 liquor; goods ratio, and 90° C. for 60 min. The desired flow rate is ~75 l/min, and is determined by foam levels in the unit. The winch speed setting is 13, which corresponds to a fabric speed of 16 m/min.

At the end of the scouring sequence, the liquor is dropped, and as much of the residual liquor is stripped from the tube by continuing to operate the winch. A solution of acetic acid (2% glacial acetic acid, owf) in 18 l of warm water is added, and the jet is run for a further 10 min to neutralize the residual caustic.

Biopolishing

The biopolishing stage is run at a liquor:goods ratio of 7.5:1 containing 0.1% Inkmaster 750 owf (surfactant). The buffer used is 0.05 M sodium acetate at pH 5; a concentrated buffer solution is added to the required volume of warm water in the jet dyer's holding tank. The diluted buffer solution is added to the fabric, and allowed to circulate through the jet dyer for about 5 min. before withdrawing a 200 ml aliquot used to measure the liquor pH. If the pH is high, small amounts (1–2 ml) of glacial acetic acid is added to achieve the target of 5 +/−0.1.

Once the pH is achieved, the unit is programmed to run for 60 min at 55° C. The enzyme is added when this temperature is achieved. At the end of the 60 min. biopolishing period, the liquor is dropped, although small amounts are removed to examine for the presence of liberated fibers. Again, the fabric is run across the winch for a short period to strip any free liquor from the fabric.

Peroxide Bleaching 4 g of DTPA and the desired amount of Inkmaster 750 m (0.25% owf) is suspended in one liter of water and stirred with a magnetic stirrer. A separate preparation which comprises 2% (owf) of 50% NaOH is weighed out and added to the DTPA/Inkmaster preparation and combined with an additional 3% (owf) of sodium silicate (42 'Be).

Warm tap water is charged to the holding tank; with the one liter of DTPA:surfactant added to it, the volume is sufficient so that the total with the will provide a 7.5:1 liquor:goods ratio. The liquor is dropped into the jet dyer and programmed to achieve a temperature of 70° C., and to remain there for 60 min.

Hydrogen peroxide, 50 wt %, is weighed out to provide 1% of 100% active material owf. It is added to the jet dyer when the temperature achieved 60° C. and allowed to circulate. The combined caustic/silicate charge is added as the temperature approached 70° C. Dilution and wash liquor for this material is removed from the dyer. Foaming is observed at this stage, and the liquor flow is slowed to reduce the foaming potential. The foaming decreases as the bleaching stage proceeded.

After 60 min. at this temperature, the liquor is dropped (sewered), but liquor samples are collected to visually examine for the presence of fibers liberated during the process. Again, any free liquor is stripped from the fabric by running the winch after the liquor has been dropped.

The fabric is washed using 18 l of warm water which contains 2% (owf) of glacial acetic acid and 2% (owf) of sodium thiosulfate. After 15 min, this is dropped, and a further 18 l of warm water is added for a final 10 min. wash.

The fabric tube is removed, centrifuged, and dried for 50 min. in a tumble dryer. The tumble-dried knit tube was allowed to condition under AATCC conditions (65% Relative humidity ±2% and 70° F.±2) for at least 24 hr. (until no further weight change was observed), and the dried weight is recorded.

Repetitive Laundry Testing

The biopolished tubes are sectioned into six equal length sections, and rejoined by seaming on the inside of the tube. Three of the completed tubes, containing 5 different sections are then submitted to the AATCC Laundering Test Method 124-1996, employing AATCC 1993 detergent. Tubes are removed from the testing at 5, 15, and 30 cycles, and ballast, in the form of greige cotton interlock tubes, are added to achieve the 1.8 kg load mandated by this method.

Results

Nu-Martindale Pilling

The amount of pilling is determined by mounting the fabric specimen samples on a Nu-Martindale pilling tester. This unit has a counter, which counts the number of revolutions, which the fabric has experienced. It automatically shuts off after 125, 500, and 2000 revolutions allowing the operator to make a visual comparison of the amount of pilling with standards supplied with the unit. The whole operation is run, as is ASTM Method D 4970-89. The measurement scale goes from 1.5 to 5, with the upper values representing no/little pilling at the point where the observations are made.

Figure 3:
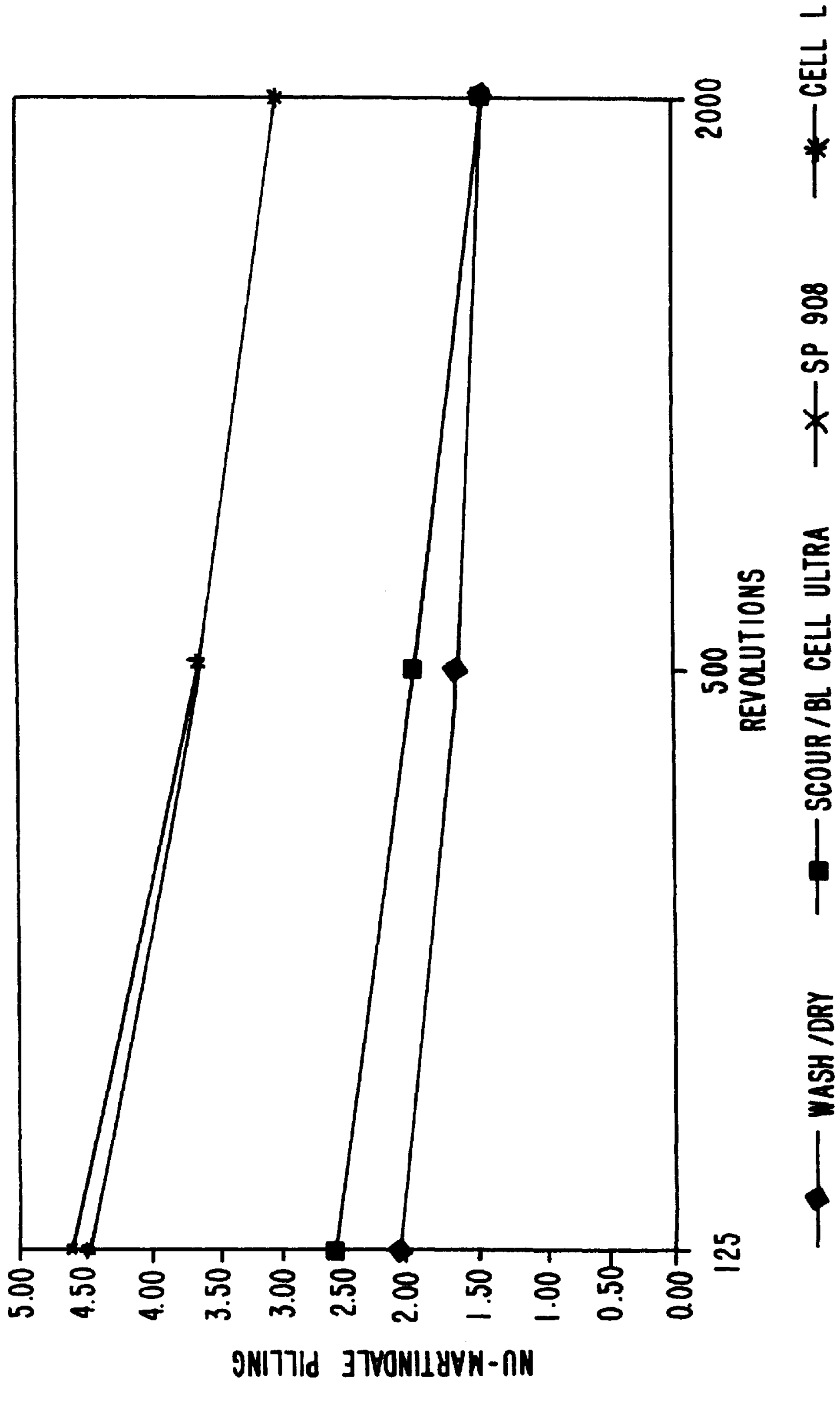
FIG. 3 shows Nu-Martindale Pilling for Scour:Biopolishing:Bleach sequence.

The results are shown in FIG. 3. It appears that in each of these three cellular preparations, the method using the biopolishing step between scouring and bleaching provide superior pilling results. It appears that better pilling results are obtained using either the mixture or the multicomponent enzyme.

Pilling During Laundering

Figure 4:
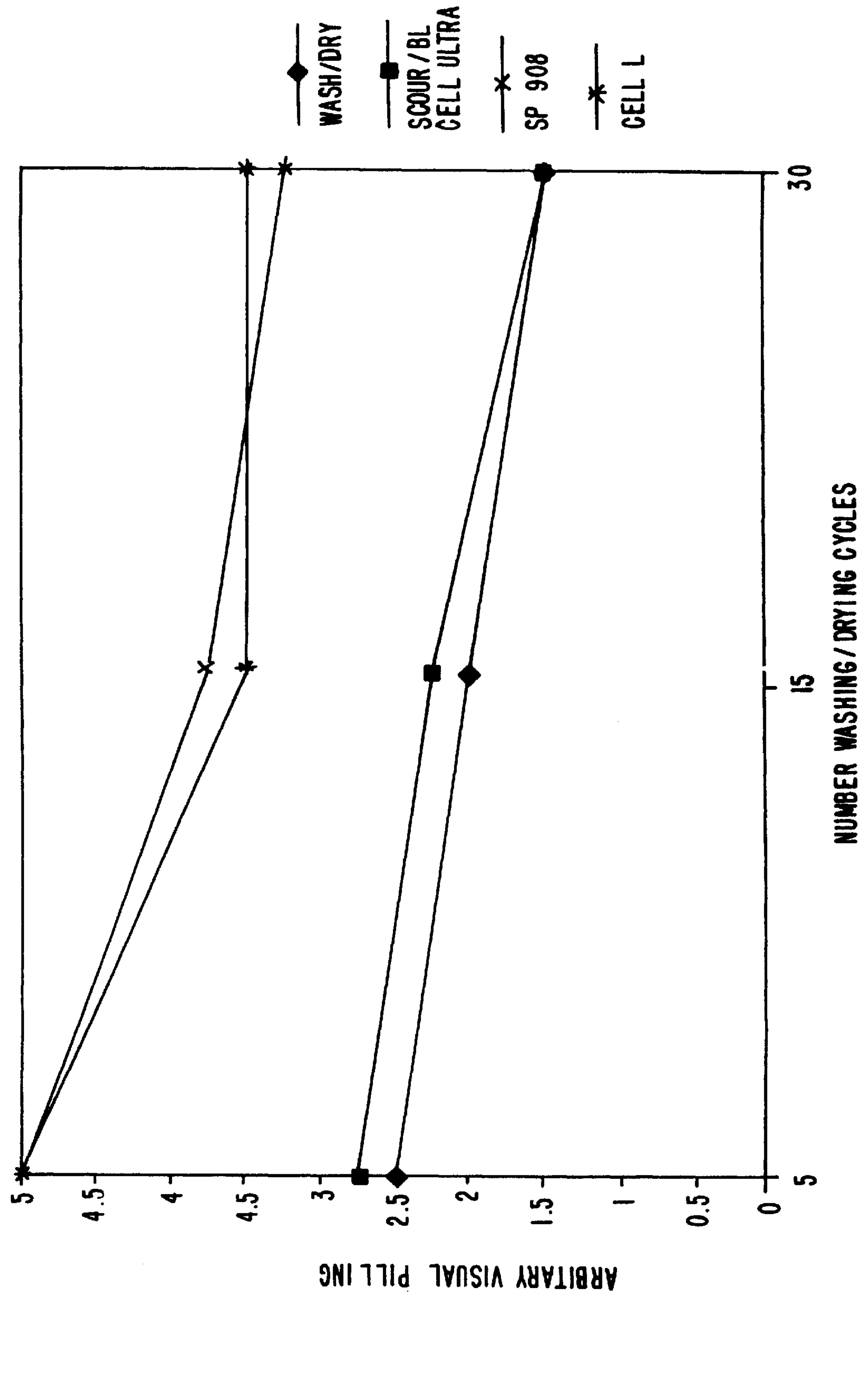
FIG. 4 shows Scour:Biopolish:Bleach Piling after Washing/Drying Treatment.

To more clearly determine the degree of pilling during normal use of the fabric, pilling is observed while the fabric is subjected to the FIG. 4 provides the pilling response observed during the AATCC Laundering Test Method 124-1996. This method specifies the use of AATCC 1993 detergent to remove variability from the source.

The visual grading of these fabrics after 5, 15, and 30 cycles is shown in FIG. 4. This rating assumes an arbitrary scale where a 5 represents the best appearance, and this decreases as it moves to a lower value. There is a discrepancy in the appearance of the original fabrics between the cellulase treated and the non-enzyme treated fabrics. The quality of the appearance of all of the fabrics decreases with increasing washing and drying cycles, yet the cellulase treated samples seem to hold their own after 15 laundry cycles. The quality of the control fabrics continues to degrade with increasing laundry cycles.

In contrast to the Nu-Martindale pilling results obtained in the previous section, there is little or no difference between the Cellusoft Ultra™ monocomponent treated fabric, and the other fabrics treated with a multicomponent cellulase. This is an important difference between the two pilling methods, and would demonstrate that with this process sequence, a cellulase treatment, and not necessarily the type of cellulase preparation is the important factor.

Physical Property Changes

The loss of burst strength (Mullen) is shown in Table 3. The trends are similar to those obtained earlier using the scoured, bleached, and dried cotton interlock fabric. The greatest fabric strength damage occurs with the Trichoderma, with less damage being done as the amount of Cellusoft Ultra™ increases. Again, there is only a slight decrease in burst values in enzyme treated samples.

TABLE 5

Burst Values for Treated Cotton Interlock Fabrics (Ave. of 10 readings/sample)

| Sample | AVERAGE, psi |
|---|---|
| Wash Only | 108.3 |
| Scour + Bleach | 103.8 |
| Cellusoft Ultra ™™ | 101.1 |
| Mixture A | 99.9 |
| Cellusoft L ™ | 98.1 |

Example 3

Experimental

Equipment

Werner-Mathis JFO jet dyer, sold by Wemer Mathis, U.S.A., Concord, N.C. Nu-Martindale pilling tester, James H. Heal, and sold by Crosrol, Inc., Greenville, S.C.

Mullen burst tester, manufactured by B. F. Perkins, Chicopee, Mass.

Macbeth OMS-1 Optiview, manufactured by Macbeth Division, Kollmorgen Instr. Corp., New Windsor, N.Y.

Balance, pH meter, etc.

Tests/Analysis

Fabric weight loss, visual check for liberated fibers in spent liquors, brightness/color response, pilling (Nu- Martindale), AATCC laundry evaluation Test Method 124-1996, with visual pill examination after 5, 15, and 30 cycles, and Mullen burst test on fabrics after scour:biopolish:bleach treatment.

Chemicals/Enzymes

Enzymes: Cellusoft Ultra™, 162 ECU/g (Novo Nordisk, A/S); Cellusoft L™, 810 EGU/g (Novo Nordisk A/S); Mixture A, 302 EGU Cellusoft L™+112 ECU Cellusoft Ultra™/g Buffer: 0.05 M sodium acetate, from sodium acetate trihydrate, adjusted to pH 5±0.1.

Sodium silicate, 42 'Be, containing 14% NaOH and 27% SiO2 (Aldrich Catalog item 33,844-3)

Fabric: An unbleached cotton interlock knit fabric is used as test fabric. The weight of this fabric is ~200 g/ sq. meter. 5.5 m lengths of the fabric is cut, slit in half along the long axis of the fabric and rejoined to make a tube having a weight of >800 g. These tubes can be conditioned under AATCC conditions as described in the previous examples and weighted just before the jet dryer treatment. They will be loaded into the jet after wetting out in a washer, followed by removal of excess water in the Bach centrifuge.

Conditions for Individual Steps:

Alkaline Scour

The alkaline scour is run using 2.5% sodium hydroxide owf (use 50% aqueous sodium hydroxide) and a surfactant at 0.5% owf. The scouring is done using a 12:1 liquor; goods ratio, and 90° C. for 60 min. The desired flow rate is ~75 l/min, and is determined by foam levels in the unit. The winch speed setting is 13, which corresponds to a fabric speed of 16 m/min.

At the end of the scouring sequence, warm water is added to represent an overflow wash condition, and the jet is run to remove the residual caustic. This liquor is unit cooled to 77° C., then dropped and glacial acetic acid (~1% owf) will be added at a 20:1 liquor:goods ratio to attempt to bring the fabric pH down to about pH 5.

Biopolishing

The biopolishing stage is run at a liquor:goods ratio of 10:1 containing 0.1% surfactant owf. The buffer used is 0.05 M sodium acetate at pH 5 (±0.1); a concentrated buffer solution is added to the required volume of warm water in the jet dyer's holding tank. The diluted buffer solution is added to the fabric, and allowed to circulate through the jet dyer for about 5 min. before withdrawing a 200 ml aliquot used to measure the liquor pH. If the pH is high, small amounts of glacial acetic acid is added to achieve the target of 5+/−0.1.

Once the pH is achieved, the unit is programmed to run for 60 min at 55° C. The enzyme is added when this temperature is achieved. At the end of the 60 min. biopolishing period, the liquor is dropped, although small amounts are removed to examine for the presence of liberated fibers. Again, the fabric is run across the winch for a short period to strip any free liquor from the fabric.

Peroxide Bleaching

Sufficient water is added to the jet from the holding tank so that the total will provide a 10:1 liquor:goods ratio. The additives include the lubricant, Multiplus™ added at 0.75 g/l, the surfactant Kierlon TX 199™ added at 1 g/l and the stabilizer Prestogen K added at 0.4 g/l. Multiplus™, Kierlon TX 199™ and Prestogen K™ are obtained from BASF. After these materials are dissolved in sufficient water and added to the jet, 50% NaOH is added to provide a final concentration of 4 g/l. After all of the liquor is in the jet, it is programmed to achieve a temperature of 93° C., and to remain there for 45 min.

Hydrogen peroxide, 50 wt %, is weighed out to provide 1% of 100% active material owf. It is added to the jet dyer when the temperature achieved 66° C. Foaming may be observed at this stage and the liquor flow may need to be slowed to minimize the foaming potential.

After 45 min. at this temperature, the liquor is dropped (sewered), but liquor samples are collected to visually examine for the presence of fibers liberated during the process. The fabric will be rinsed for 10 min. with warm (71° C.) water (20:1 liquor/goods). After 10 minutes, this is dropped and a repeat warm water rinse is performed. After a cool (38° C.) rinse, the excess caustic and peroxide are considered to be removed from the tube.

The fabric tube is removed, centrifuged, and dried for 50 min. in a tumble dryer. The lint is removed and weighed, and the fabric was dried for a further 20 min. The tumble-dried knit tube is allowed to condition under AATCC conditions (65% Relative humidity ±2% and 70° F.±2) for at least 24 hr. (until no further weight change was observed), and the dried weight is recorded.

Repetitive Laundry Testing

Approximately 0.5 m of each of the samples are sectioned and reassembled into tubes so that a segment from each treatment condition will be included. The two outboard samples will comprise a sample subjected to just scour/bleach at one end and a control with no treatment beyond wetting at the other end. The target weight of these tubes will be no more than 600 g, so that three of the tubes will achieve 1.8 kg, the fabric weight used for the AATCC laundry performance test. They are laundered according to the provisions of this test and tubes are removed after 5, 15 and 30.

Results

Nu-Martindale Filling

The amount of pilling is determined by mounting the fabric specimen samples on a Nu-Martindale pilling tester. This unit has a counter, which counts the number of revolutions, which the fabric has experienced. It automatically shuts off after 125, 500, and 2000 revolutions allowing the operator to make a visual comparison of the amount of pilling with standards supplied with the unit. The whole operation is run as is ASTM Method D 4970-89. The measurement scale goes from 1.5 to 5, with the upper values representing no/little pilling at the point where the observations are made.

The results are shown in Table 4 below.

TABLE 6

Pilling Values of Treated Fabric

| Sample | 125 | 500 | 2000 |
|---|---|---|---|
| None | 2.5 | 2.0 | 1.7 |
| 2.5 ECU/g Cellusoft Ultra ™ | 4.0 | 3.3 | 2.7 |
| 1% Mixture A | 4.7 | 4.0 | 3.2 |
| 1% Cellusoft L ™ | 4.5 | 3.8 | 3.2 |

It appears that in each of these three cellulase preparations, the method using the biopolishing step between scouring and bleaching provide superior pilling results. It appears that better pilling results are obtained using either the mixture or the multicomponent enzyme.

Pilling During Laundering

As practiced in Example 2, knit fabric tubes made up of segments from the treatment conditions used here are subjected to the AATCC Laundering Test Method 124-1996. Again, the AATCC 1993 Detergent is used in the laundering tests. The tubes are removed after 5, 15, and 30 laundering cycles using this test.

Rather than using a numerical scale to rank the amount of piling which occurred at each of these junctures, the segments in the individual tubes are subjectively compared. Even after 30 laundering cycles, it is difficult to discern differences between any of the cellulase treated fabrics from this series of runs. There is, however, no difficulty in observing large differences between the cellulase treated fabrics and the control fabric samples, wither untreated or scoured and bleached.

Physical Property Changes

The loss of burst strength (Mullen) is shown in Table 5. Again, there is only a slight decrease in burst values in enzyme treated samples.

TABLE 7

Burst Values

| Sample | Average Burst Value (psi) |
|---|---|
| Wash only | 133.3 |
| Scour/Bleach | 120.1 |
| 2.5 ECU/g Cellusoft Ultra ™ | 110.4 |
| 1% Mixture A | 118.5 |
| 1% Cellusoft L ™ | 111.7 |

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

Various references are cited herein, the disclosures of which are incorporated by reference in their entireties.

What is claimed is:

1. A batch process for treating a cellulosic fabric, said process comprising: (i) scouring said fabric under alkaline conditions, (ii) treating said fabric with cellulase, (iii) bleaching said fabric, and (iv) drying said fabric, wherein said fabric is treated with cellulase in a batch process after scouring and before bleaching.

2. The process according to claim 1, in which said cellulosic fabric is a cotton fabric.

3. The process according to claim 1, in which said fabric is scoured by treating said fabric with one or more scouring agents selected from the group consisting of sodium hydroxide, soda ash, phosphates, and surfactants.

4. The process according to claim I in which said fabric is treated with at least one scouring agent for about 30 min. to 90 min.

5. The process according to claim 1 in which said fabric is treated with at least one scouring agent at a temperature between about 80 and about 100° C.

6. The process according to claim 1, in which said cellulase is a multicomponent cellulase.

7. The process according to claim 1, in which said cellulase is derived from Trichoderma.

8. The process according to claim 1, in which said cellulase is a monocomponent cellulase.

9. The process according to claim 8, in which said monocomponent cellulase is derived from Humicola.

10. The process according to claim 1, in which said cellulase is a mixture of a multicomponent and monocomponent cellulase.

11. The process according to claim 5, in which said fabric is treated with cellulase at a temperature between about 10 and about 65° C.

12. The process according to claim 1, in which said fabric is treated with cellulase at a pH between about 4 and about 6.5.

13. The process according to claim 1, in which said fabric is treated with cellulase at a level between about 200 and about 2,000 EGU/kg fabric.

14. The process according to claim 1, in which said fabric is treated with between about 1,000 and about 10,000 ECU/kg fabric.

15. The process according to claim 1, in which said fabric is bleached with at least one bleaching agent selected from the group consisting of hydrogen peroxide, sodium hypochlorite and sodium chlorite.

16. The process according to claim 1, in which said fabric during the bleaching step is treated with a bleaching liquor comprising a bleaching agent and a surfactant.

17. The process according to claim 1, in which said fabric during the bleaching step is treated with a bleaching liquor comprising a bleaching agent and a lubricant.

18. The process according to claim 1, in which said fabric during the bleaching step is treated with a bleaching liquor comprising a bleaching agent and a stabilizer.

19. The process according to claim 1, in which said fabric during the bleaching step is treated with a bleaching liquor comprising a bleaching agent, a lubricant, a surfactant, and a stabilizer.

20. The process according to claim 1 in which said fabric is treated with at least one bleaching agent at a temperature between about 45 and about 80° C.

21. The process according to claim 1, further comprising a dyeing step after step (iii) and before step (iv).

22. A batch process for reducing pilling of a fabric during at least one laundry cycle, said method comprising the sequential steps of:

(a) scouring the fabric under alkaline conditions;

(b) treating the scoured fabric of step (a) with cellulase;

(c) bleaching the treated fabric of step (b); and (d) drying the bleached fabric of step (c).

* * * * *